United States Patent
Sato et al.

(10) Patent No.: US 6,485,696 B1
(45) Date of Patent: Nov. 26, 2002

(54) RECOVERY/REMOVAL OF METALLIC ELEMENTS FROM WASTE WATER USING OZONE

(75) Inventors: Motoaki Sato, Reston, VA (US); Eleanora I. Robbins, Vienna, VA (US)

(73) Assignee: The United States of America as represented by the Secretary of the Interior, Washington, DC (US)

(*) Notice: Subject to any disclaimer, the term of this patent is extended or adjusted under 35 U.S.C. 154(b) by 0 days.

(21) Appl. No.: 09/429,647

(22) Filed: Oct. 29, 1999

Related U.S. Application Data

(60) Provisional application No. 60/106,260, filed on Oct. 30, 1998.

(51) Int. Cl.[7] .................. C22B 11/00; C22B 13/00; C22B 21/00; C22B 23/00; C22B 47/00
(52) U.S. Cl. .................. 423/22; 423/42; 423/43; 423/50; 423/87; 423/92; 423/127; 423/140
(58) Field of Search .................. 423/50, 140, 92, 423/93, 42, 43, 22, 87, 122, 124, 35, 141, 142, 123, 127; 210/709, 721, 722, 760

(56) References Cited

U.S. PATENT DOCUMENTS

| | | | | |
|---|---|---|---|---|
| 4,034,059 A | * | 7/1977 | Clark et al. | 423/144 |
| 4,162,294 A | * | 7/1979 | Witzke et al. | 423/127 |
| 4,332,687 A | * | 6/1982 | Daignault et al. | 210/721 |
| 4,557,908 A | * | 12/1985 | Laveyne et al. | 423/164 |
| 4,752,412 A | * | 6/1988 | Van Antwerp et al. | 423/22 |
| 5,009,793 A | * | 4/1991 | Muller | 423/140 |
| 5,080,805 A | * | 1/1992 | Houser | |
| 5,316,751 A | * | 5/1994 | Kingsley et al. | 423/36 |
| 5,364,947 A | * | 11/1994 | Murray et al. | 210/760 |
| 5,370,800 A | * | 12/1994 | Stevenson | 210/710 |
| 5,419,882 A | * | 5/1995 | Jibiki | 423/111 |
| 5,492,633 A | * | 2/1996 | Moniwa et al. | 210/760 |
| 5,534,234 A | * | 7/1996 | Reddin et al. | |
| 5,580,458 A | * | 12/1996 | Yamasaki et al. | 210/609 |
| 5,607,653 A | * | 3/1997 | Back et al. | 423/235 |
| 5,639,347 A | * | 6/1997 | Lindberg | 210/712 |
| 6,027,543 A | * | 2/2000 | Yoshizaki et al. | 423/27 |

FOREIGN PATENT DOCUMENTS

| | | | |
|---|---|---|---|
| CZ | 100929 | * | 9/1961 |
| CZ | 102895 | * | 3/1962 |
| CZ | 106524 | * | 2/1963 |

OTHER PUBLICATIONS

Translation of Czech. Patent 100929, Sep. 1961.*
Translation of Czech. Patent 102895, Mar. 1962.*
Translation of Czechoslovak patent 102895.*
Translation of Czechoslovak patent 100929.*

* cited by examiner

Primary Examiner—Steven Bos
(74) Attorney, Agent, or Firm—Ross F. Hunt, Jr.

(57) ABSTRACT

Ozone is used to rapidly oxidize specific metallic elements. The insoluble oxidized compounds of the metals formed by the ozonation are then recovered for industrial use in a conventional sedimentation/filtration tank or pool. There is no requirement for pre-treating or neutralizing the acid mine discharge, even when iron is the dominant metal. If the pH of the untreated acid mine discharge is less than about 2.5, metals other than iron precipitated first. After that, the pH is raised and the iron is precipitated as ferric hydroxide. Aluminum is removed as hydrated aluminum compounds after removal of the iron prior to discharging the acid mine discharge to streams. Both the ozonation and neutralization processes are monitored and controlled using electrochemical sensors and feedback controllers.

10 Claims, 9 Drawing Sheets

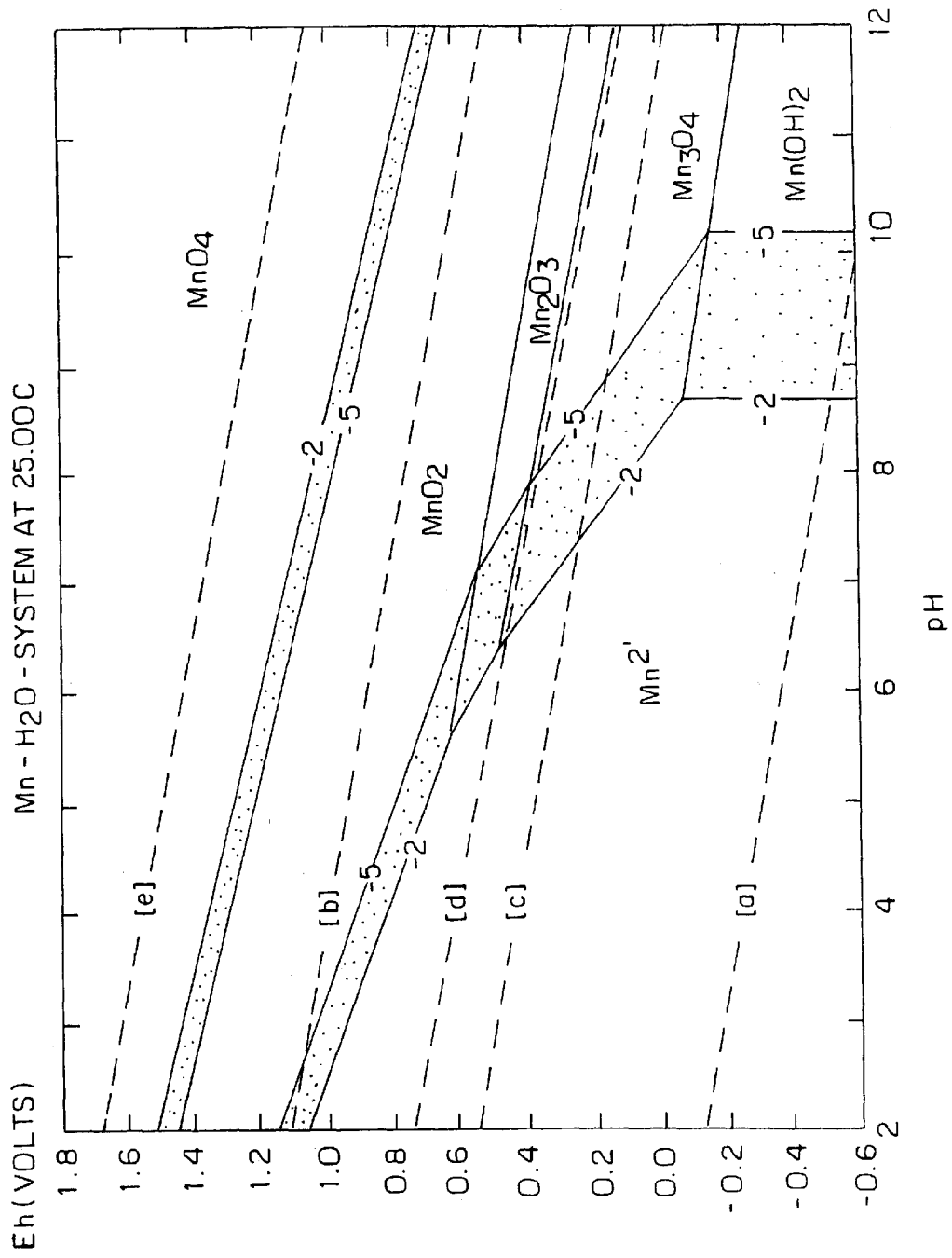

IRON

MANGANESE

LEAD

SILVER

NICKEL

COBALT

PALLADIUM

BISMUTH

THALLIUM

Eh-pH TRACE OF QUEENS FORK AMD BY OZONE AND COARSE CALCITE POWDER

RECOVERY/REMOVAL OF METALLIC ELEMENTS FROM WASTE WATER USING OZONE

RELATED APPLICATIONS

The present application claims priority from provisional application Serial No. 60/106,260, filed Oct. 30, 1998, the entire contents of which are hereby incorporated by reference.

FIELD OF THE INVENTION

The present invention relates to a method for recovering and/or removing metallic elements from waste water.

BACKGROUND OF THE INVENTION

Environmental Hazard

Runoffs from a variety of industrial operations such as electrical power plants, steel plants, and mines are known to be contaminated with various metal compounds including iron, manganese, aluminum, zinc, copper, lead, arsenic, and chromium. These contaminants pose a serious environmental problem, as these runoffs cannot be safely discharged into the environment. Previously used methods to remove these contaminants involved adding lime, soda ash, or other neutralizing agents, and treating the runoff in a holding pond or clarifying tank. However, these methods have not been satisfactory because of the long periods of time required to effect treatment.

In particular, acid mine drainage from active and abandoned coal and metal mines is a serious environmental problem that affects thousands of miles of streams in the United States and elsewhere. Acid mine drainage, as well as mine tailings and refuse piles, also discolors streams. The metal sulfides that are part of many coal beds and ore deposits are oxidized when mining operations bring them within reach of oxidizing conditions created, directly or indirectly, by atmospheric free oxygen. This oxidation produces dissolved sulfate ion and metal ions. Because acidic wastewater, including acid mine drainage, discolors streams, damages ecological systems, and harms wildlife, federal and state limits for waste-water effluent require that the discharge pH be between 6 and 9, and that the concentration of common metallic elements such as iron and manganese be less than 2 milligrams per liter (mg/L) [cf. U.S. Environmental Protection Agency, 1994]. More stringent limits exist for toxic elements such as lead, arsenic, cadmium, and mercury.

Slow Oxidation by Oxygen and Extensive Ferric Iron Stains

Thermodynamically, aerated water should be capable of oxidizing ferrous iron ($Fe^{2+}$) completely to ferric iron ($Fe^{3+}$), with a equilibrium redox potential (also referred to as Eh when referenced to the standard hydrogen electrode, or ORP if not so specified) of:

$$O_2+4H^++4e^-=2H_2O$$

$Eh=1.23-0.059$ pH$+0.015$ log ($pO_2$) volts  [Eq. 1]

This Eh value is shown as line [b] in FIG. 1, which is an Eh-pH diagram for the Fe—$H_2O$ system.

At sea level, $pO_2=0.21$ bars, and [Eq. 1 reduces to:

$Eh=1.22-0.059$ pH volts [Eq. 1'].

In acid solutions, the ratio of ferrous ion and ferric ion concentrations is related to Eh as $$Fe^{3+}+e^-=Fe^{2+}$$

$Eh=0.77+0.059$ log($Fe^{3+}/Fe^{2+}$) volts [Eq. 2]

By equating [Eq. 2] with [Eq. 1'], one can readily see that, at equilibrium, only a trace of $Fe^{2+}$ should remain in solution, even when the pH is 3. When the pH increases, $Fe^{3+}$ is precipitated as $Fe(OH)_3$:

$$Fe^{3+}+3H_2O=Fe(OH)_3+3H^+,$$

$\log(Fe^{3+})=4.84-3$ pH pH unit  [Eq. 3]

and $Fe^{3+}$ is precipitated as $Fe(OH)_3$:

$$Fe(OH)_3+3H^++2e^-=Fe^{2+}+3H_2O$$

$Eh=1.06-0.177$ pH$-0.059$ log($Fe^{2+}$) volts  [Eq. 4]

These equations show that, upon exposure to air or meteoric water saturated with air; iron should be precipitated as a solid phase, even in mildly acidic discharges, if true thermodynamic equilibrium were attained.

In reality, however, the Eh values of aerated waters are about 0.4 volts lower than the value calculated in [Eq.1']. Sato [1960] measured the in situ Eh-pH values of mine waters at various depths, and found that, regardless of the type of deposits, the values in the oxidized zone were distributed within two parallel lines on an Eh-pH diagram, shown in FIG. 1. These lines are defined by the reaction:

$$O_2+2H^++2e^-=H_2O_2$$

$Eh=0.68-0.059$ pH$+0.0295$ log[($pO_2$)/($H_2O_2$)] volts  [Eq. 5]

The lower parallel line, marked [c] in FIG. 1, corresponds to the ($pO_2$)/($H_2O_2$) ratio of unity:

$Eh=0.68-0.059$ pH volts  [Eq. 5']

The upper parallel line, marked. [d] in FIG. 1, corresponds to the ratio of $10^6$:

$Eh=0.86-0.059$ pH volts  [Eq. 5"]

In laboratory oxidation of both $Fe^{2+}$ and $Mn^{2+}$ solutions, Sato [1960] showed clearly that the rate of Eh increase dropped drastically at the Eh value of [Eq. 5'] and never went over the value of [Eq. 5"] even after prolonged aeration. A plausible explanation is that $O_2$ is somehow reluctant (i.e., a high activation energy barrier exists) to being split up in one step, and the faster reaction path is to form hydrogen peroxide as an intermediate. However, in the presence of iron, manganese, or a similar multivalent element, hydrogen peroxide is catalytically decomposed to oxygen and water, as discussed by Latimer [1952]. The result of this cyclic process is that oxygen becomes incapable of raising Eh beyond [Eq. 3"] in acidic solutions. Alternative paths may be provided by some aerobic microorganisms, but even with such help, the process of oxidation by oxygen is still relatively slow at surface temperatures.

The extremely slow rate of oxidation by oxygen beyond the Eh of [Eq. 3"] is the primary cause for the phenomenon of red iron stains formed for miles in the downstream direction from both treated and untreated acid mine discharge sites. When the pH is 2.5 to 4, ferric hydroxide can be precipitated by aeration alone, albeit slowly. The slow reaction ensures that a large fraction of the iron remains in solution as ferrous ion for a long time. Furthermore, the precipitation of iron as ferric hydroxide releases free sulfuric acid, which then becomes a secondary acidification step. Therefore, the pH often decreases downstream upon exposure to air even after neutralization treatment by anoxic limestone drains or by lime or caustic soda, which are bases used to bring the pH to more than 6 to meet discharge regulations.

The above pH range partially overlaps the range of active precipitation of gelatinous aluminum hydroxide (pH 4.5 to 6, Nordstrom and Ball [1986], and Hemingway [1982]; see FIG. 2) and aluminite, $Al_2(SO_4)$ $(OH)_4.7H_2O$ (pH 4.0, Robbins et al, [1996]). These poorly crystalline aluminum hydroxide and hydroxy-sulfate compounds and ferric hydroxide typically coat the limestone used in treatment, slowing down the neutralization process.

In FIG. 1, the range of pH was limited in this diagram to 1 to 11, because that is the pH range which is relevant to the present invention. The solid compound phases of iron are the most unstable hydroxide phases, $Fe(OH)_3$ and $Fe(OH)_2$, because these are the phases that actually precipitate upon addition of base, and also upon oxidation in the case of $Fe(OH)_2$. The shaded area around these hydroxides is the region of active precipitation of iron as a solid from its ionic state in aqueous solution. The border on the ionic side is defined by the activity (concentration) of $10^{-2}$ molar (560 mg/L Fe) and that on the solid side by the activity of $10^{-5}$ molar (0.56 mg/L Fe) of $Fe^{2+}$ or $Fe^{3+}$ ion. The horizontal line that crosses the diagram at an Eh value of 770 mV indicates equal activities of ferrous and ferric ions. The four parallel lines with a slope of 59 mV per pH marked with a bracketed letter are as follows:

[a] the standard-hydrogen electrode i.e., $H_2$—$H_2O$ redox couple;

[b] the standard potential of the $H_2O$—$O_2$ couple;

[c] the standard potential of the $O_2$—$H_2O_2$ couple; and

[d] the empirical limiting potential of oxidation by air.

Manganese and Sludge Problem

Manganese is more difficult to precipitate than iron when using air. The lowest pH that $Mn^{2+}$ ion can be oxidized by air oxidation to a solid phase is about 6.5, if the $Mn^{2+}$ concentration is as high as 550 mg/L, as shown in FIG. 3. To reduce the concentration to a more typical value of 0.55 mg/L without dilution, the minimum pH necessary for the oxidation is about 8.5. This is difficult to achieve with limestone alone, because the equilibrium of pure calcium carbonate at atmospheric partial pressure of carbon dioxide ($3 \times 10^{-4}$ bars) is pH 8.3. Lime, slaked lime, caustic soda, or sodium carbonates are needed if the pH is less than 8.5. This alkalization not only consumes large quantities of basic reagents, it also produces equally massive waste material, i.e., sludge, which must eventually be disposed of in land fills.

In FIG. 3, the range of pH is given as 2 to 12, but this limit is merely for purposes of illustration. Manganese appears to precipitate as oxides, except for the purely $Mn^{2+}$ state. The shaded area around these oxides is the region of active precipitation of manganese as a solid from its ionic state in aqueous solution. The border on the ionic side is defined by the activity of $10^{-2}$ molar (550 mg/L Mn) and that on the solid side by the activity of $10^{-5}$ molar (0.55 mg/L Mn) of $Mn^{2+}$ or $MnO_4^-$ ion. The parallel lines marked with a bracket are as follows:

[a] the standard hydrogen electrode potential, i.e., $H_2$—$H_2O$ redox couple;

[b] the standard potential of the $H_2O$—$O_2$ couple;

[c] the standard potential of the $O_2$—$H_2O_2$ couple; and

[d] the empirical limiting potential of oxidation by air;

[e] the estimated maximum redox potential for ozonated gas in [Eq4'].

Use of Ozone as and Oxidizer or Sanitizer

Ozone, $O_3$, is a powerful and fast oxidizer, having a redox potential of:

$O_3 + 2H^+ + 2e^- = O_2 + H_2O$ $Eh = 2.08 - 0.059 \, pH + 0.0295 \, \log(pO_3/pO_2)$ volts  [Eq. 6]

Ozone can be generated from pure oxygen or from air by passing the oxygen or air through a corona discharge field between two plates, or, more commonly, through concentric tubes of a dielectric material such as aluminosilicate glass, each backed by a thin metallic electrode. Alternatively, the oxygen or air can be passed through a silica glass tube irradiated by a ultra violet light source such as a mercury lamp. Ozone generators of various designs and capacities have been available commercially for at least 50 year.

The partial pressure of ozone in air that can be generated efficiently in modern devices is as much as 2 volume percent of oxygen, so that the practical upper limit of Eh of solution saturated with ozonated air is about:

$Eh = 2.08 - 0.059 \, pH - 0.0295 \, \log(0.02) = 2.03 - 0.059 \, pH$  [Eq. 6']

Ozone is used to disinfect and deodorize drinking water supplies in a large scale in many countries, including the United States, because it is converted to oxygen gas once oxidation is completed. Ozone is also used to degrade toxic organic and inorganic (e.g., cyanide) substances in ground water, sewage, and other waste water. More than 1600 papers were referenced by Rice [1984] regarding these and other applications of ozone. However, only a limited number of systematic studies of the use of ozone for removing metallic elements have been published. A few of these methods were directed to removing metallic elements. One example is the use of ozonated air to remove iron and manganese (0.1 to 0.5 mg/L level) and odor from pumped ground water that was contaminated by polluted, reducing water of the Rhine River [Weissenhorn, 1984].

A report specifically directed to acid mine drainage and not included in the bibliography of Rice [1984] was published by Rozelle and Swain [1974], who reported the results of static bench-top experiments that involved oxidation of near-neutral, pH-buffered $Mn^{2+}$ solutions using ozone, hypochlorite ion, and chlorine gas. They found that ozone could reduce manganese solution concentrations by oxidizing $Mn^{2+}$ from about 10 mg/L to 0.1 mg/L in relatively short times, about 1–5 minutes, at pH 7–8. These authors concluded that "in order for ozonation to be useful for manganese removal from acid mine drainage, the acid mine drainage would have to be treated to remove iron because iron (II) is preferentially oxidized by ozone. This process would raise the pH. The ozonation would then be a secondary treatment"

Table 1 of this patent application show the redox potentials of elements that form solids from solution upon oxidation.

TABLE 1

Redox potential (Eh) of elements that form solids from solution upon oxidation

| Element | Ionic Form | Solid | Eh (volts) | v' (volts) | v" (volts) |
|---|---|---|---|---|---|
| Iron | $Fe^{2+}$ | $Fe(OH)_3$ | 1.06 | 0.177 | 0.059 |
| Manganese | $Mn^{2+}$ | $Mn_3O_4$ | 1.82 | 0.236 | 0.089 |
| " | | $Mn_2O_3$ | 1.75 | 0.177 | 0.059 |
| " | | $MnO_2$ | 1.23 | 0.118 | 0.0295 |

TABLE 1-continued

Redox potential (Eh) of elements that form solids from solution upon oxidation

| Element | Ionic Form | Solid | Eh (volts) | v' (volts) | v" (volts) |
|---|---|---|---|---|---|
| Lead | $Pb^{2+}$ | $PbO_2$ | 1.45 | 0.118 | 0.0295 |
| Silver | $Ag^+$ | $AgO$ | 1.77 | 0.118 | 0.0295 |
| Nickel | $Ni^{2+}$ | $Ni_3O_4$ | 1.98 | 0.236 | 0.089 |
| " | | $Ni_2O_3$ | 1.75 | 0.177 | 0.059 |
| " | | $NiO_2$ | 1.59 | 0.118 | 0.0295 |
| Cobalt | $Co^{2+}$ | $Co_2O_3$ | 1.75 | 0.177 | 0.059 |
| " | | $CoO_2$ | 1.61 | 0.118 | 0.0295 |
| Palladium | $Pd^{2+}$ | $PdO_2$ | 1.19 | 0.118 | 0.0295 |
| Bismuth | $BiO^+$ | $Bi_4O_7$ | 1.64 | 0.177 | 0.118 |
| Thallium | $Tl^+$ | $Tl(OH)_3$ | 1.19 | 0.089 | 0.0295 |

*Note:
The redox potentials expressed as "Eh = Eh ° - v' pH - v "log(cation)"" and the numerical values are for 25° C. For other temperatures, minor corrections may be necessary.

Use of Ozone for Recovery of Metallic Elements

To the best of the knowledge of the present inventors, there has been no literature published on this topic. A summary report made by Concurrent Technologies Corporation [1996] lists existing technologies to separate and/or purify recovered metal values. There is no disclosure of using ozone for this purpose.

Conventional treatments raise the pH of acidic waste water, such as the acid mine drainage, to 8.5 to 11 by adding large amounts of basic chemicals. After this, the contaminated water is impounded in large sedimentation ponds to allow atmospheric oxygen to oxidize and flocculate the metallic elements. This two-stage process produces large quantities of sludge, and is very slow and inefficient.

A number of other techniques have been disclosed to clean acidic waste water. Kinglsley et al., in U.S. Pat. No. 5,316,751, disclose using ozone to clean certain constituents of mine tail residues. In this process sands and slimes are separated from larger materials and the sands are separated from slimes. These slimes are deposited at a location at which the slimes are immersed in water, and the sands are deposited at a location where water can be drawn from the top surface of the slimes. The surface of the sands is sprayed with an aqueous solution of a leaching agent to leach metals and metal compounds from the sands. The slimes are injected with an aqueous solution of a leaching agent to leach metals and metal compounds from the slimes. Ozone can be used to break down resident cyanide before the residue is discharged. Metals and metal compounds are then recovered from the water drawn from the sands and slimes.

Yamasaki et al., in U.S. Pat. No. 5,580,458, disclose a method for treating waste water using a combination of calcium carbonate and microorganisms. Aluminum is added to remove fluorine from the wastewater.

Moniwa et al., in U.S. Pat. No. 5,492,633, disclose a process for treating water with ozone to oxidize and decompose trace amounts of organic substances contained in the water. A chelate compound is injected into the water to be treated after or just prior to the introduction of water into the reaction tank.

Murray et al, in U.S. Pat. No. 5,364,947, disclose a process for separating non-oxidizable compounds from a mixture containing at least one oxidizable compound by contacting the mixture with ozone to oxidize oxidizable compounds. These oxidized compounds are then converted to water-soluble hydrazones, which are then separated from the mixture using precipitation, liquid/liquid extraction, chromatography, etc.

Stevenson, in U.S. Pat. No. 5,370,800, discloses a method for removing metal compounds from waste water by adjusting the pH of the water to from 5 to 12, aerating the waste water, adding a flocculating agent to the water to flocculate metal compounds, and separating the flocculated metal compounds from the water.

Kazi et al., U.S. Pat. No. 4,752,412, disclose a method for recovering precious metals from ore by treating the ore in an acidic slurry with an activated oxygen mixture obtained from an ultraviolet light ozone generator. The activated oxygen frees chemically bonded precious metals, creating an expanded, hydrated ore so that the metals can be oxidized and leached out using standard leaching techniques.

Lindberg, U.S. Pat. No. 5,639,347, discloses a method for removing metals from acidic liquids containing dissolved metals by oxidizing the liquid with ozone, hydrogen peroxide, and/or air to increase the valence of the metals, making them easier to precipitate. After oxidation, the pH of the liquid is adjusted to over 6 to precipitate the metals.

Back et al., U.S. Pat. No. 5,607,653, disclose a process for treating and detoxifying salts-hydroxide scrubber wastes containing nitrite salts or sulfite salts. This process provides a continuous flow oxidation of the waste solution with ozone, followed by a neutralization step with monobasic potassium phosphate. Alternatively, oxidation and neutralization can be conducted in one step by adding hydrogen peroxide and monobasic potassium phosphate.

SUMMARY OF THE INVENTION

It is an object of the present invention to overcome the deficiencies in the prior art.

It is another object of the present invention to provide a process for recovering/removing metals from acidic waste water.

It is a further object of the present invention to provide a one-stage process for recovering/removing metals from acidic waste water.

It is another object of the present invention to provide a method for removing manganese stains from a substrate.

According to the present invention, ozone is used to rapidly oxidize specific metallic elements, including iron, manganese, lead, silver, nickel, cobalt, palladium, bismuth, thallium, and chromium which are present in acidic waste water either in a pond or in a flow reactor. The insoluble oxidized compounds of the metals formed by the ozonation are then recovered for industrial use in a conventional sedimentation/filtration tank or pool. There is no requirement for pre-treating or neutralizing the acidic waste water, even when iron is the dominant metal.

If the pH of the untreated acidic waste water is less than about 2.5, it is easy to separate iron from the other metals. After recovering the other metallic elements, iron is precipitated as ferric hydroxide using a conventional neutralizing agent such as finely powdered limestone.

Aluminum is removed as hydrated aluminum compounds by controlled neutralization after removal of the iron and prior to discharging the treated acidic waste water to streams.

Both the ozonation and neutralization processes are preferably monitored and controlled using electrochemical sensors and feedback controllers.

If the waste water has a near-neutral pH from pretreatment, but contains the above-mentioned metals in excess of allowed discharge limits, the process of the present invention can efficiently reduce the levels of these metals to allowable levels.

[a] The standard hydrogen electrode potential ($H_2$—$H_2O$ redox couple);
[b] the standard potential of the $H_2O$—$O_2$ couple;
[c] the standard potential of the $O_2$—$H_2O_2$; and
[d] the empirical limiting potential of oxidation by air.

Figure 2:
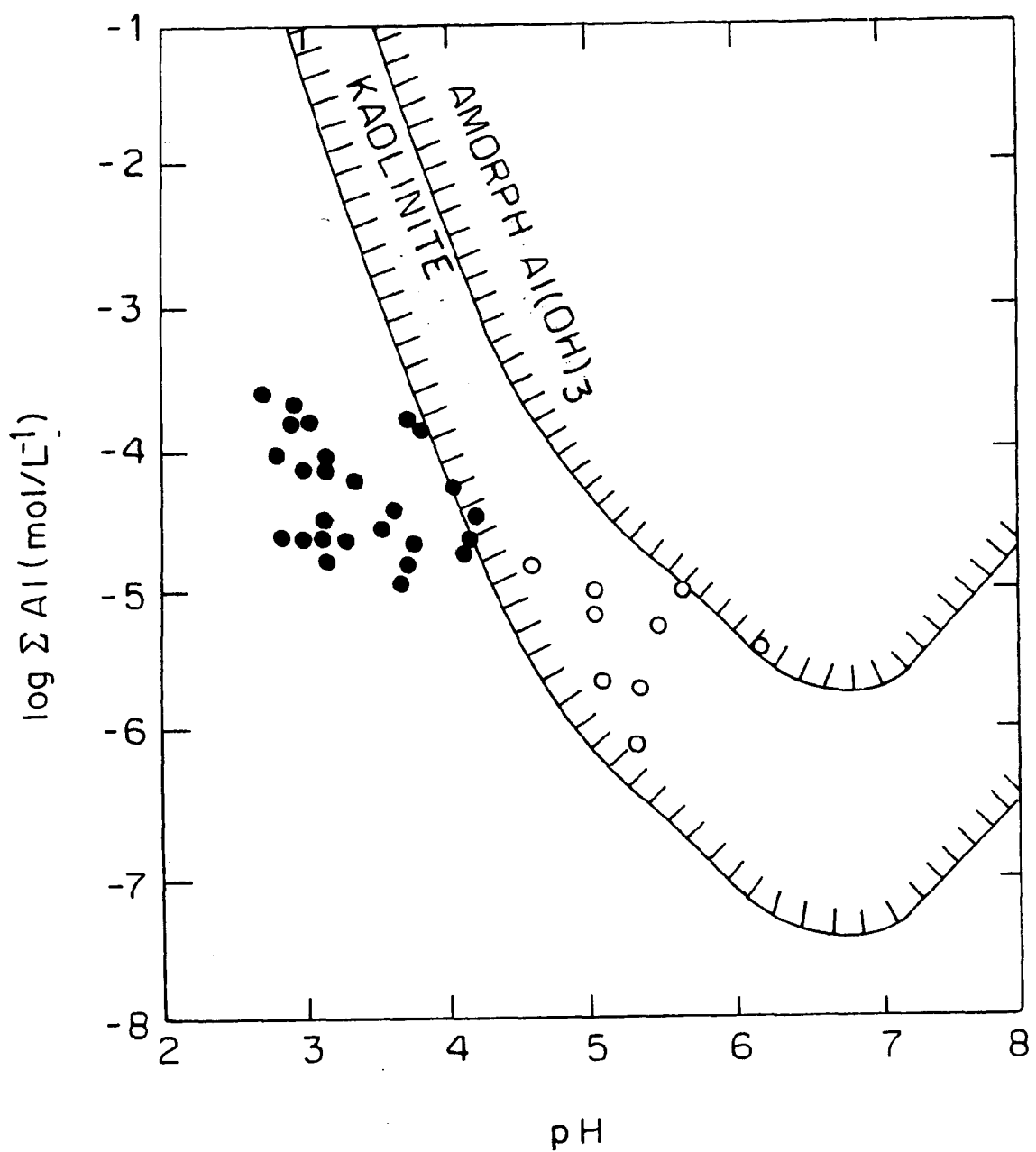

FIG. 2 is a solubility diagram of amorphous $Al(OH)_3$ as a function of pH. This is what precipitates initially from the ionic solution; it inverts to more stable hydroxides and oxides with time. The solubility has a broad minimum somewhere between 5 and 6.5 pH. This diagram, taken from Nordstrom and Ball [Science, 1986], explains why it is not advisable to raise the pH beyond 6.5. The dissolved Al concentration clearly increases with pH beyond this value.

Figure 1:
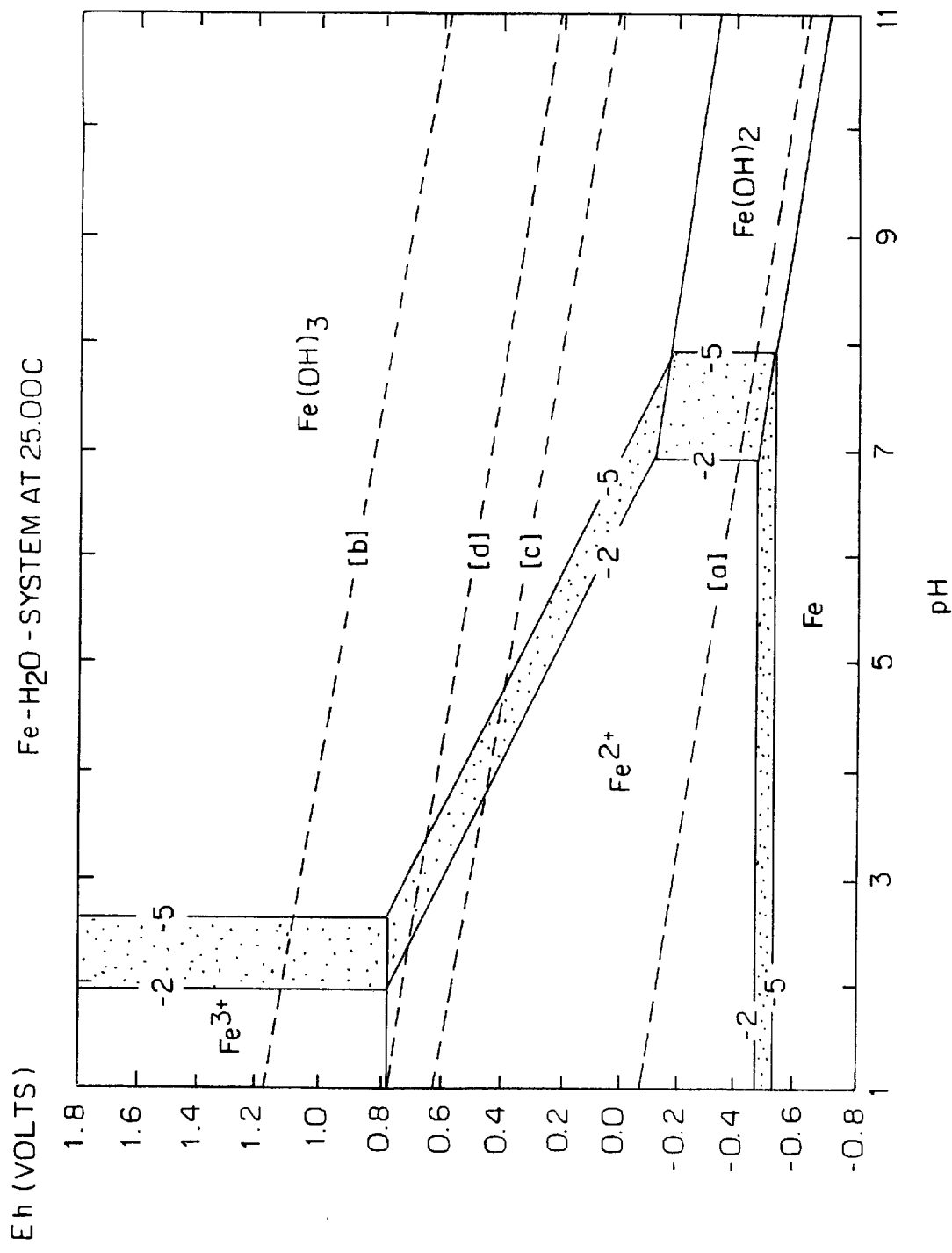
FIG. 1 is an equilibrium Eh-pH diagram for the Fe—O system at 25° C. and 1 atm pressure. The range of pH is limited to 1 to 11, which is relevant to the present invention. The solid compound phases of iron are the most unstable hydroxide phases, $Fe(OH)_3$ and $Fe(OH)_2$, because these are the phases that actually precipitate upon addition of a base, and also upon oxidation in the case of $Fe(OH)_3$. The shaded area around these hydroxides is the regime of active precipitation of iron as a solid from its ionic state in aqueous solution. The border on the ionic side is defined by the activity of $10^{-2}$ molar (560 mg/L Fe) and that on the solid side by the activity of $10^{-5}$ molar (0.56 mg/L Fe) of $Fe^{+2}$ or $Fe^{+3}$ ion. The horizontal line that crosses the diagram at an Eh value 770 mV indicates equal activities of ferrous and ferric ions. The four parallel lines with a slope 59 mV/pH marked with brackets are as follows.

FIG. 3 is an equilibrium Eh-pH diagram for the Mn—O system at 25° C. and 1 atm pressure. The range of pH shown is from 2 to 12. Manganese appears to precipitate as oxides except for purely $Mn^{2+}$ state. The shaded area around these oxides is the region of active precipitation of manganese as a solid from its ionic state in aqueous solution. The border on the ionic side is defined by the activity of $10^{-2}$ molar (550 mg/L Mn) and that on the solid side by the activity of $10^{-5}$ molar (0.55 mg/L Mn) of $Mn^{2+}$ or $MnO_4^-$ ion. The four parallel lines marked [a], [b], [c] and [d] are the same as explained for FIG. 1. An additional line marked [e] is for estimated maximum redox potential for ozonated gas in [Eq.4'].

FIG. 4 is a compilation of equilibrium Eh-pH diagrams of metallic elements which form insoluble compounds upon ozone treatment. In each diagram, the area with no hatching is where the metallic element exists as metal, lightly hatched areas oxidized insoluble compound(s); and heavily hatched area as dissolved ions. The activities of ionic forms are all $10^{-6}$ molar. The diagrams are compiled from Pourbaix [1996].

Figure 4A:
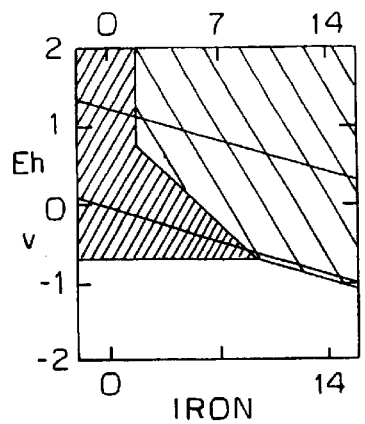
Figure 4B:
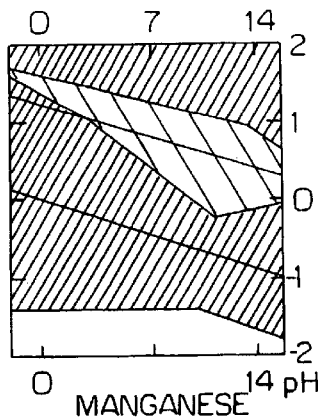
Figure 4C:
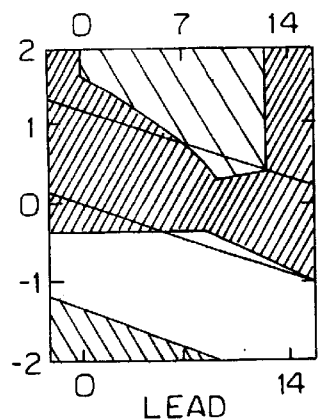
Figure 4D:
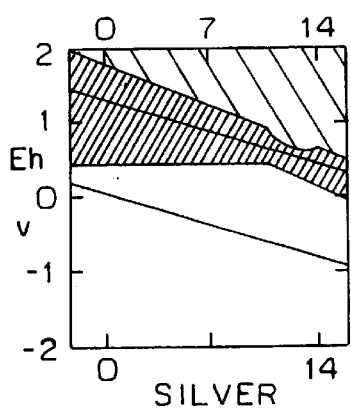
Figure 4E:
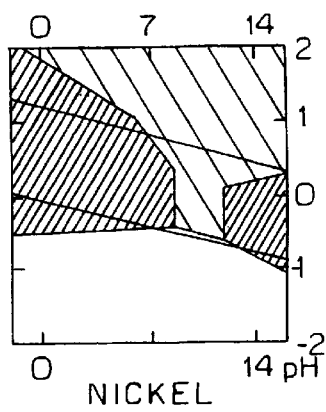
Figure 4F:
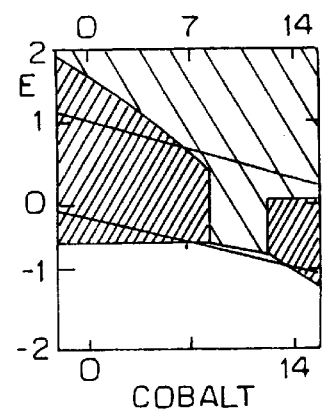
Figure 4G:
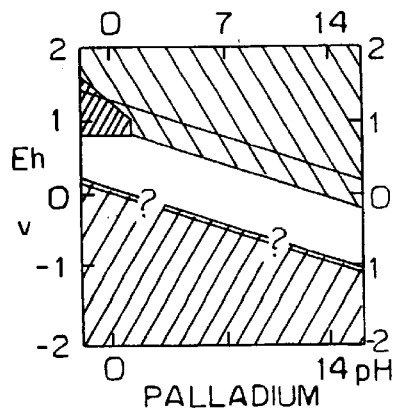
Figure 4H:
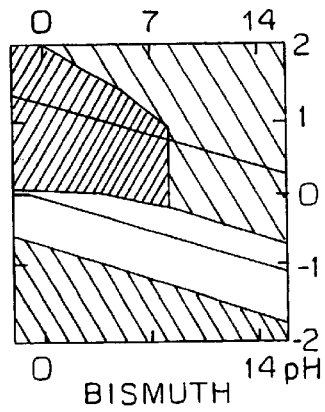
Figure 4I:
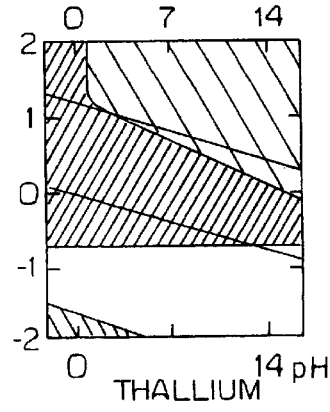

FIG. 4a shows the diagram for iron.
FIG. 4b shows the diagram for manganese.
FIG. 4c shows the diagram for lead.
FIG. 4d shows the diagram for silver.
FIG. 4e shows the diagram fro nickel.
FIG. 4f shows the diagram for cobalt.
FIG. 4g shows the diagram for palladium.
FIG. 4h shows the diagram for bismuth.
FIG. 4i shows the diagram for thallium.

Figure 5:
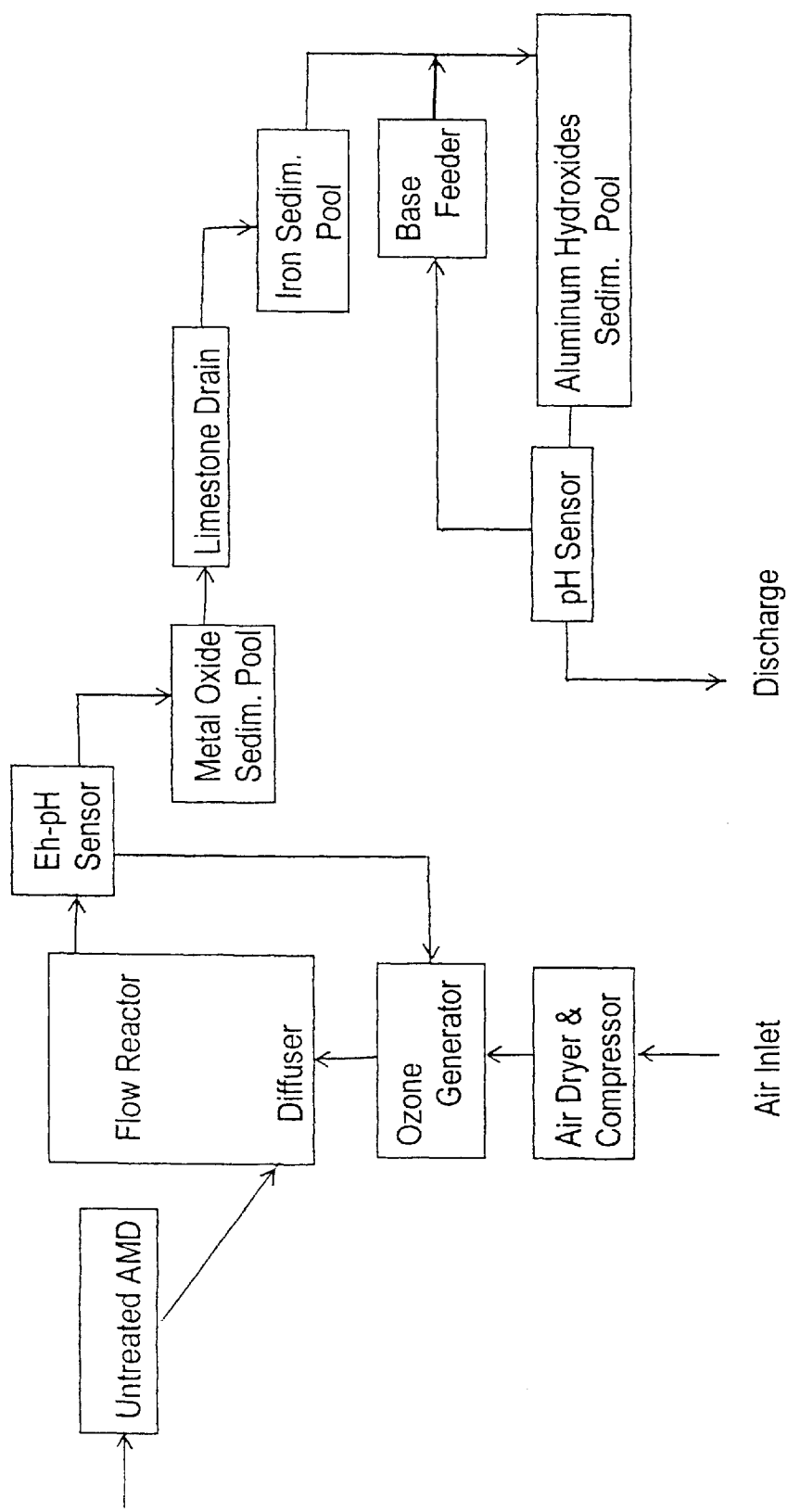

FIG. 5 is a schematic diagram illustrating the Method I process for metal recovery/removal treatment of acid mine drainage using ozone and base chemicals. More detailed descriptions are given in the main text.

Figure 6:
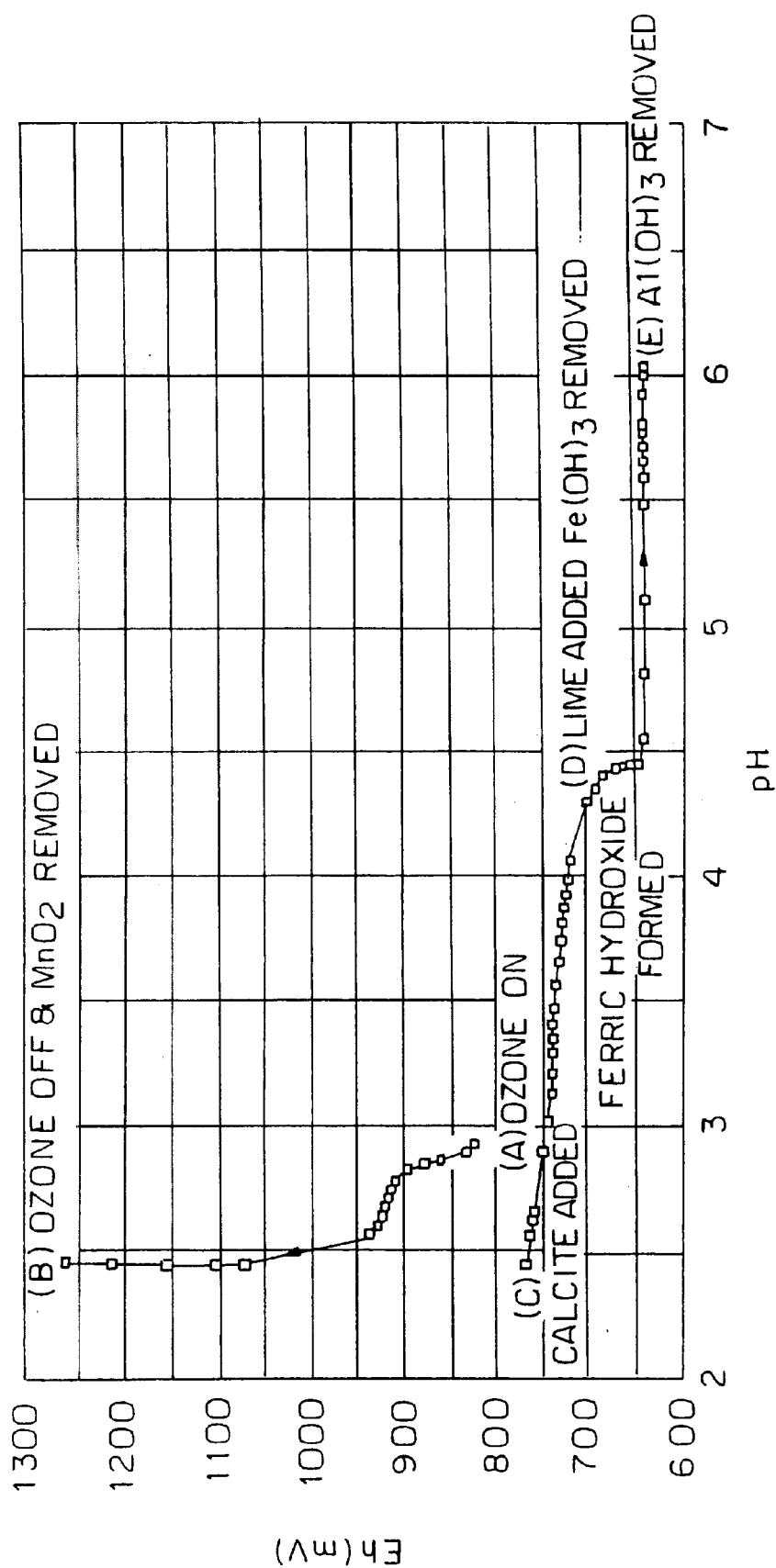

FIG. 6 is the Eh-pH trace of a laboratory experiment conducted to verify the Method I process. The acid mine discharge that was treated according to the Method I process is from the Queen Forks coal mine, West Virginia. It is characterized by relatively high acidity, Mn and Al concentrations, the type which is hardest to process by conventional methods. The metals were quantitatively precipitated. More detailed descriptions are given in the text.

Figure 7:
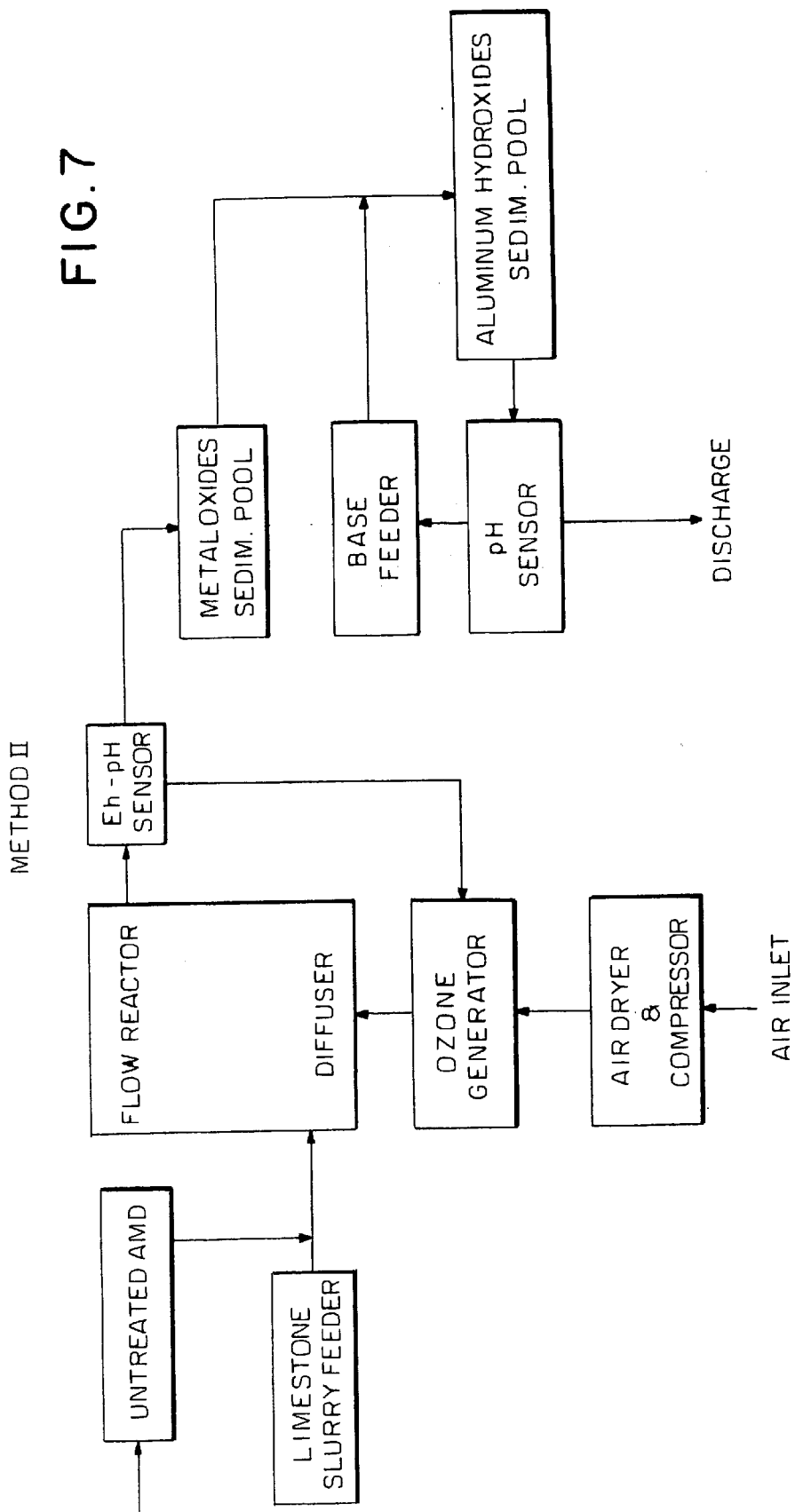

FIG. 7 is a schematic diagram illustrating the Method II process for the treatment of acid mine discharge using ozone and base chemicals. Being simpler and more economical to operate, this method is suitable when the separation of iron from the other precipitating metals is not advantageous for economic reasons. More detailed description are given in the text.

Figure 8:
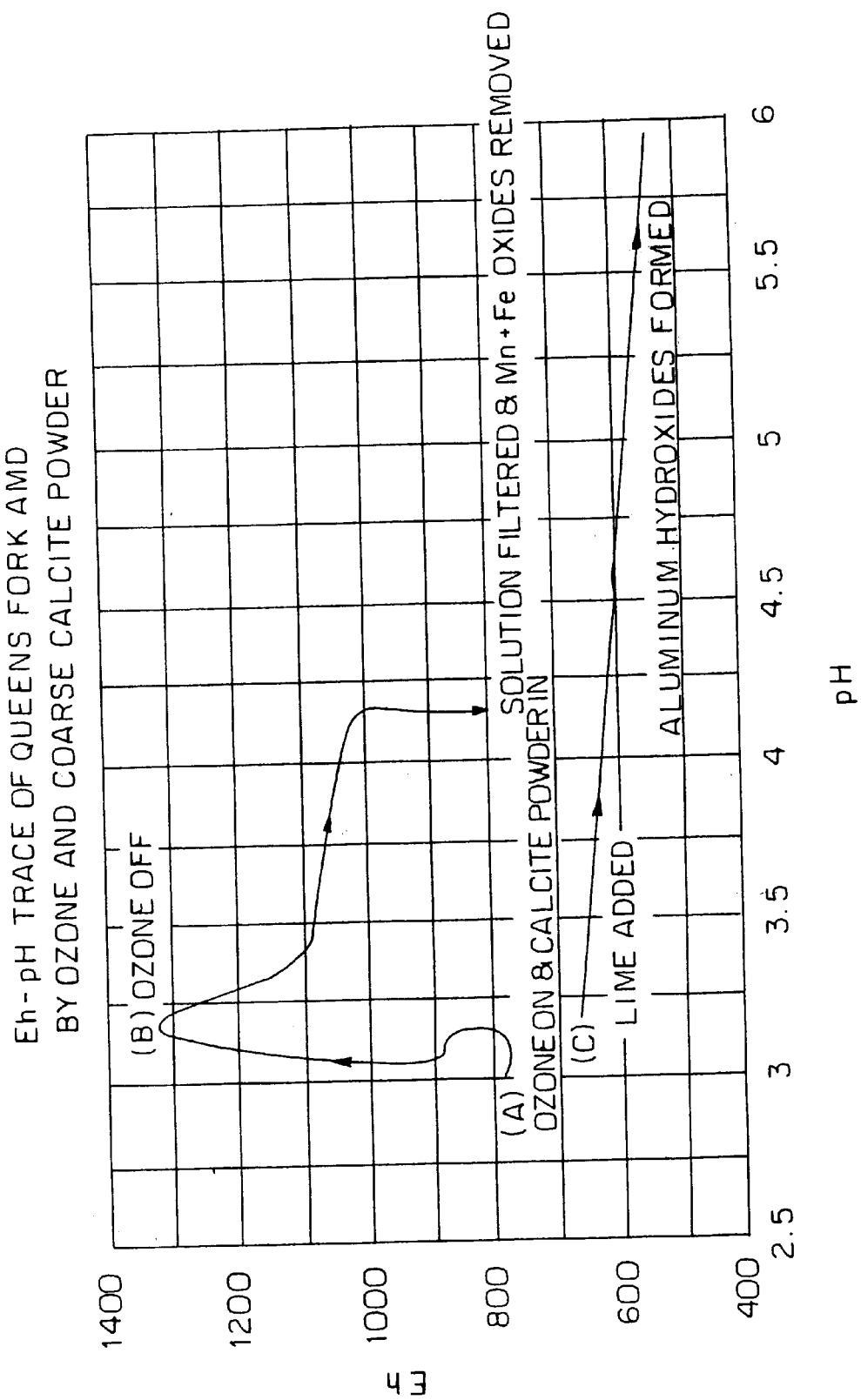

FIG. 8 is the Eh-pH trace of a laboratory experiment conducted to verify the Method II processing of acid mine discharge. The discharge used is from the Queens Fork mine, West Virginia. More detailed descriptions are given in the text.

Figure 9:
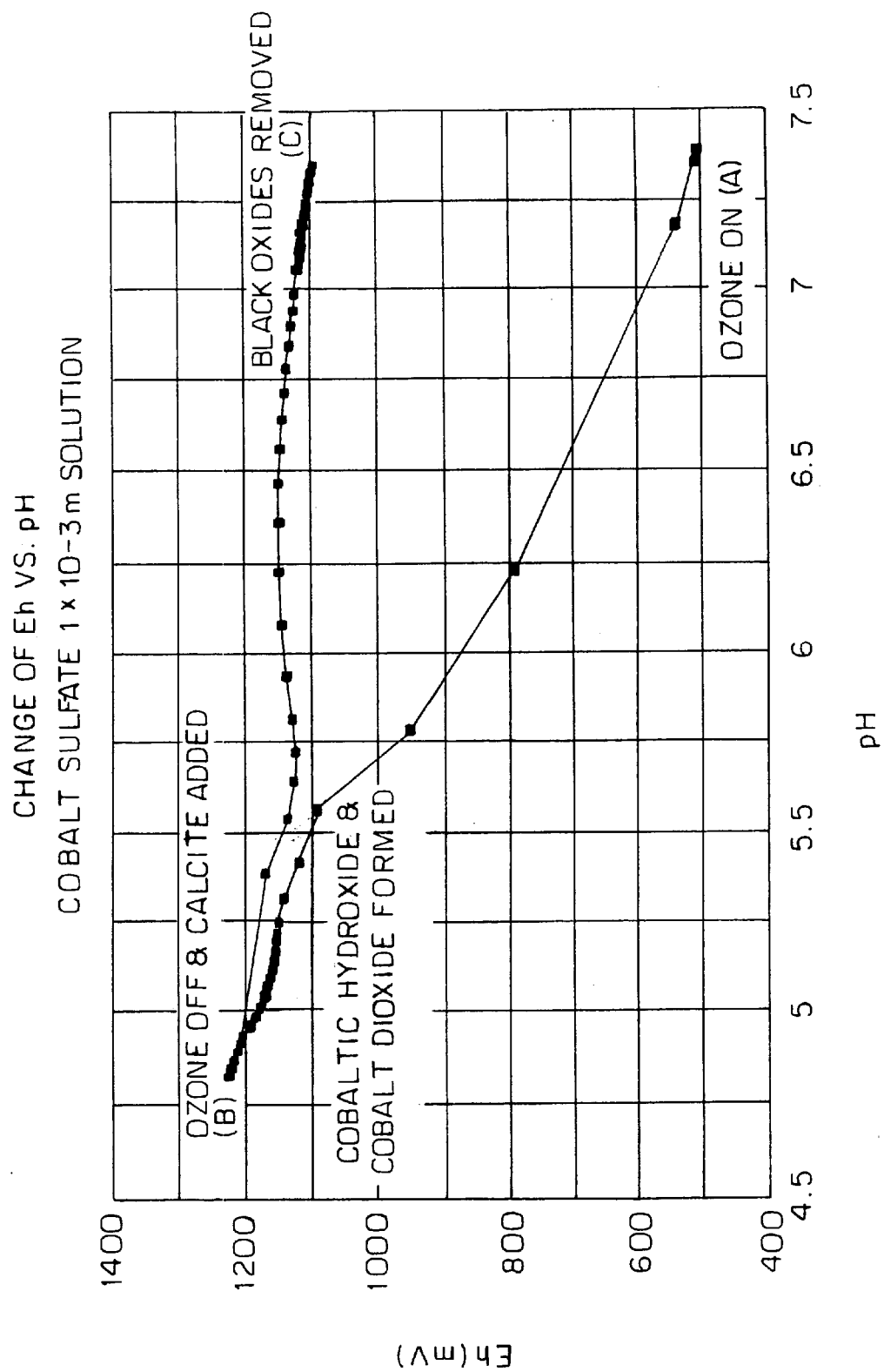

FIG. 9 is the Eh-pH trace of a laboratory experiment conducted to verify that cobalt oxides can be precipitated by ozone in acid solution as theoretically predicted on the basis of Eh-pH diagrams of FIG. 4. The solution used is $1\times10^{-3}$ molar cobalt sulfate solution. Similar precipitation of higher oxides was also obtained with Nickel sulfate, silver sulfate, and lead nitrate solutions.

DETAILED DESCRIPTION OF THE INVENTION

The present invention provides methods for removing and/or recovering heavy metallic elements which are dissolved in acidic waste water. Heavy metals which can be removed from acidic waste water using the process of the present invention are manganese, lead, silver, nickel, cobalt, palladium, bismuth, thallium, and iron. These elements form insoluble oxides and hydroxides when the Eh of the waste stream is elevated beyond the value calculated using the formula shown in Table 1.

Thus, the present invention provides a method for removing/recovering a group of metals from acid waste waters, including acid mine discharge and other industrial waste water. Ozone is used to rapidly oxidize the metals to form insoluble, oxidized compounds of the metals. This process can be effected either in ponds or in a flow reactor.

The pH of the acidic waste water may be adjusted to precipitate iron by using a slow-reacting base material, preferably limestone powder or limestone slurry, after which the pH is raised to precipitate aluminum as aluminum hydroxides.

Where the pH of the waste water is less than about 2.5, iron remains in the waste water as ferric ion, whereas the other metals are precipitated. This permits separating the other metals from iron, which is advantageous because the iron is generally more abundant in the waste water than the other metals, and the other metals can be sold for a higher price than iron.

The pH of the waste water becomes the lowest possible pH upon ozonation because precipitation of the cationic metal ions as oxidized solids frees anionic sulfate ions, thereby increasing the concentration of free sulfuric acid. This makes the neutralizing reaction with less costly, slow-reacting base material such as limestone powder or limestone slurry react more quickly, and thus be adaptable to a flow treatment process.

The pH of the acidic waste water can be raised using base material either during ozonation or after ozonation. The pH is raised to about 6–6.5, which is only slightly higher than the range of the minimum solubility of aluminum hydroxides. By raising the pH only to about 6–6.5, the amount of caustic soda or lime used is minimized, and the amount of sludge formed is minimized. This sludge, when buried, may cause secondary contamination of ground and stream waters, and thus it is desirable to eliminate formation of this sludge.

To obtain optimum results, electrochemical sensors are used to monitor and control the ozonation process and/or the neutralizing process.

In the course of developing this invention, the inventors discovered that acidified aqueous hydrogen peroxide is particularly valuable for removing manganese stains from substrates, because hydrogen peroxide acts as a reducing agent in acid solution for highly oxidized substances. The acidified hydrogen peroxide solution can be used for cleaning a variety of manganese-stained substrates, including household and industrial glass, ceramics, plastics, and metals. Of particular interest is the use of acidified aqueous hydrogen peroxide solution for cleaning electrochemical sensors such as those used in the present invention.

Simplified equilibrium Eh-pH diagrams of the elements that can be recovered are compiled in FIG. 4. In these diagrams, a white area represents the metal stability field, a densely hatched area represents the dissolved ionic field, and a lightly hatched area denotes an insoluble compound field. In FIG. 4, the concentration of dissolved ionic species is taken as $10^{-6}$ molal. Two parallel inclined lines in each diagram define the stability field of water, the upper line corresponding to the Eh of the water-oxygen (at one bar) reaction and the lower line for that of the water-hydrogen (at one bar) reaction. The relative position of this line may suggest that oxygen is capable of precipitating oxidized compounds of some of the elements, such as iron, even in acidic solutions. However, the rates of such oxidation reactions are very slow at low pH levels when the Eh is above the line marked "c" in a more expanded diagram for iron, cf. FIG. 1, and for manganese, cf. FIG. 3. Oxygen ceases to elevate the Eh of aqueous solution beyond the line marked "d" in the two expanded diagrams. This behavior of oxygen necessitates adding neutralizing agents to the acidic waste water and impounding it over a large area to provide enough time for the oxygen to oxidize the dissolved metals to solid compounds. Alternatively, large amounts of base agents are typically added to the acidic waste water to accelerate precipitation of the metals as hydroxides and/or oxides by elevating the pH to 8.5 to 11. This latter method creates sludge disposal problems.

Ozone, however, is a much more powerful and rapid oxidizing agent than atmospheric oxygen. It is generated from oxygen or air by corona discharge of electricity or ultraviolet light irradiation, and commercial generators are widely available. However, the action of ozone in the acidic waste water treatment of the present invention is greatly enhanced by the processing techniques of the present invention.

FIG. 4 is a compilation of equilibrium Eh-pH diagrams of some metallic elements which form insoluble compounds upon treatment with ozone. In each diagram, the area with no hatched is where the metallic elements exist as metal. Lightly hatched areas show oxidized insoluble compounds. Heavily hatched areas are dissolved ions. The activities of ionic forms are all $10^{-6}$ molar. The diagrams are compiled from Pourbaix [1966].

The present invention makes it possible to separate heavy metals from acidic waste water by injecting ozone into the waste water discharge stream without pre-treating the stream with base reagents. This process is effective because the aluminum concentration is reduced to the near-minimum during removal of heavy metals. This process eliminates the requirements for large quantities of base reagents, which saves the cost of the reagents as well as the costs of constructing large impoundment and sedimentation ponds, finding suitable places to bury the bulky sludge produced, and regularly transporting the sludge to disposal sites.

The present invention provides two methods for processing acidic waste water to remove and/or recover heavy metals. Method I is suitable when it is desirable to recover manganese and/or other metals which are minimally admixed with iron, provided the pH of the acid mine drainage is low, i.e., less than about 2.5. For example, some coal mines generate acid mine drainage that is rich in manganese and low in pH. Some metal mines have huge impoundments of acid mine drainage having a pH lower than 2. Method II is simpler in design, and is suitable where quick removal of the metals is of prime importance rather than selective recovery of individual heavy metals. Method II is also suitable where the pH of the acidic waste water is greater than about 2.5.

Method I (a) Ozonation Step

Metal-bearing acidic waste water is gravity-fed or pumped as a steady stream into the bottom of a reactor tank, which is at least 3.3 meters deep. A depth of at least 3.3 meters ensures that all of the ozone is consumed in the reactor and prevents accidental release of ozone into the atmosphere. The ozonated air or oxygen is preferably injected into the acidic waste water through a porous diffuser located at the bottom of the reactor. The Eh and pH values are constantly monitored at the top of the ozonated acid mine drainage flow by means of pH, Eh, and reference electrodes. (Preferably, the pH electrode is glass and the Eh electrode is platinum.) The electrodes provide signals to feedback-control the ozone generator so that Eh-pH values of the oxidized acidic waste water are maintained at targeted optimum values. The values are determined by the metals to be recovered, the pH of the treated acidic waste water, and the allowable final concentration of dissolved metal ion, as indicated in Table 1 and FIG. 4.

For example, if manganese alone is to be recovered from acidic waste water of pH 3.0, which, when ozonated, would decrease to pH about 2.4 upon precipitation of manganese dioxide and consequent freeing of sulfuric acid, and Eh of 1.1 volts will reduce the concentration of manganese ion to about 0.5 mg/L, cf. FIG. 3. An increase of Eh beyond 1.4 volts will increase the dissolved manganese concentration by producing the permanganate ion $MnO_4^-$. The optimum Eh will be about 1.2 volts at a pH of 2.5. The use of Eh-pH diagrams and related thermodynamic computations will help increase the efficiency of treating fast reversible redox processes such as the $Mn^{2+}$—$MnO_2$ and $Pb^{2+}$—$PbO_2$ reactions. However, optimum operating parameters should be confirmed in the laboratory on samples from each site prior to customizing the design details for the site.

(b) Recovery of Concentrated Metal Oxide(s) Step

The effluent from the reactor is sent to a conventional sedimentation/filtration tank or pool to separate out the suspended metal compounds. There may be some ferric hydroxide mixed with the oxidized compounds of the desired metals if the iron concentration and/or the pH is relatively high.

(c) Ferric Hydroxide Removal Step

This step is to precipitate ferric hydroxide from the ozone-treated acidic waste water, in which dissolved iron exists entirely as ferric ion, by raising the pH. The clear liquid, free of suspended particles, is gravity-fed or pumped to the second sedimentation tank or pool via a covered ditch that is filled with crushed limestone. The cover should be made of insulating material to prevent freezing in winter and be removable for occasional maintenance work. Limestone or calcite is an inherently slow neutralizer, having a relatively low solubility. It neutralizes acidic solutions steadily in the absence of dissolved aluminum. Aluminum forms amphoteric hydroxides which have solubility minima at pH 5–6. Acidic waste water generally contains dissolved alumina in abundance. When the pH is raised to about 4, gelatinous phases of aluminum hydroxide and aluminum hydroxy-sulfate begin to coat the surface of limestone, thereby impeding further increase of pH. By the time the pH reaches 3.5, however, all of the ferric ion is flocculated. Relatively pure, fine-grained ferric hydroxide is commercially valuable for use as a pigment.

(d) Aluminum Hydroxide and Aluminum Hydroxy-sulfate Removal Step

The effluent from the second sedimentation tank is gravity fed or pumped to the third sedimentation pool, which has a larger capacity than the second sedimentation tank, via a pipe equipped with a dispenser of a relatively soluble neutralizer. This step is to eliminate aluminum from the oxidized acid mine discharge, which is now free of heavy metals, by raising the pH to 6.0–6.5, so that the water can be discharged to uncontaminated streams. Conventional soluble base reagents such as lime, slaked lime, caustic soda, sodium carbonate, or less conventional natural sodium carbonate deposits such as trona and nahcolite, can be used in this step. Another inexpensive neutralizer that can be used in this step is discarded, fired, sulfur-scrubbing limestone bed material from coal-burning electricity generating plants; this is a mixture of lime and anhydride. Also, a slurry of very finely ground limestone may be used. The choice of neutralizing agent depends on availability, material cost, transportation cost, and other local factors. The amount of base material required is slightly more than enough to provide three moles of hydroxyl ions for each mole of $Al^{3+}$ ions in the acidic waste water.

The dispenser for the base reagent is controlled by an electrical signal from a pH electrode placed at the outlet side of the third sedimentation pool in such a manner that the pH of the effluent stream remains between 6.0 and 6.5. This pH range satisfies both federal and state discharge requirements, and also keeps the use of base reagents to a minimum. At the same time, the concentration of dissolved aluminum is reduced to near the minimum volubility. Raising the pH beyond 6.5 has the adverse effect of increasing the aluminate ion concentration in equilibrium with aluminum hydroxides. The natural precipitation of aluminum hydroxides is a relatively slow process, requiring a larger sedimentation pool to provide enough time for the aluminum hydroxide flocs to settle. The pH control is somewhat delicate because of the sluggish reaction. This is the reason for placing the pH electrodes in the outlet side of the pool to obtain correct feedback signals to control the base dispenser mechanism.

Experimental Verification

Acid mine discharge from the Queens Fork coal mine in West Virginia was treated with ozone, 100–200 mesh fine calcite powder, and reagent-grade lime in succession, as described above. The acid mine discharge was low in pH (2.85 in storage, total acidity 580 mg/L) and high in manganese (95 mg/L) and aluminum (85 mg/L). Exactly 250 mL of this acid mine discharge was placed into a jacketed reactor flask equipped with a combination pH electrode, a combination platinum ORP electrode, a temperature sensor, a magnetic stirrer, and an ozonated air bubbler. Air stream was fed to the bubbler via a 30 watts ozone generator at a rate of 100 mL per minute. The temperature of the reactor was maintained at 10° C. by means of recirculating constant temperature bath. A total of 240 sets of Eh, pH, and temperature were digitally acquired and processed. The number of data points was minimized when the rate of change was slow. The Eh-pH trace of the treatment is shown in FIG. 6, where the alphabetical letters in parentheses indicate what operations were performed. A significant point to note is that in the initial ozonation process, the pH decreased from 2.85 to 2.42 at an Eh of 1.10 volts due to precipitation of $MnO_2$ and the resulting secondary acidification. Preliminary chemical analyses indicate that both manganese and iron were lower than the federal limits (Mn 0.20~2.05 mg/L, Fe 0.09~0.83 mg/L).

FIG. 6 shows the Eh-pH trace of a laboratory experiment conducted to verify the process of Method I. The acid mine discharge treated was characterized by relatively high acidity, high concentrations of manganese and aluminum, which is the hardest to process by conventional methods. The metals were quantitatively precipitated.

Method II (a) Ozonation Step

Most of the procedure for this step is the same as Method I, step (a), except for the injection of very finely powdered limestone at the inlet of the untreated acid mine discharge, which brings the pH close to the range of 3.5–4. Instead of the powder, the limestone can be added as s a slurry at the inlet of the untreated acid mine discharge. This latter method makes it easier to disperse the limestone in the acid mine discharge.

In this method, all of the heavy metals, including iron, will flocculate when the acid mine drainage flow exits the reactor. The time required for the pH to reach the target value should approximately match the time required for the acid mine drainage to be completely oxidized. The ozone generation rate is controlled as described in Method I step (a). The grain size of the limestone powder is critical for adjusting the rate of the pH increase. The amount of limestone powder to be added can be estimated from the chemical composition and the flow rate of the acid mine drainage. The amount should be approximately enough to neutralize the total sulfate ion minus the sulfate ion electrically balanced by aluminum ion.

(b) Heavy Metal Compounds Removal/Recovery Step

The effluent of the ozonated acid mine discharge from the reactor is sent to a conventional sedimentation/filtration tank or pool to separate out the suspended metal compounds. In Method II, iron, manganese, and other heavy metals are all mixed together in the chemical sediment.

(c) Aluminum Hydroxide and Aluminum Hydroxy-sulfate Removal Step

The effluent from the second sedimentation tank is gravity fed or pumped to the third sedimentation pool, which has a larger capacity than the second sedimentation tank, via a pipe equipped with a dispenser of relatively soluble neutralizer. This step is to eliminate aluminum from the oxidized acid mine discharge, which is now free of heavy metals, by raising the pH to 6.0–6.5, so that the water can be discharged to uncontaminated streams. Conventional soluble base reagents such as lime, slaked lime, caustic soda, sodium carbonate, or less conventional natural sodium carbonate deposits such as trona and nahcolite, can be used in this step. Another inexpensive neutralizer that can be used in this step is discarded, fired, sulfur-scrubbing limestone bed material from coal-burning electricity generating plants; this is a mixture of lime and anhydride. Also, a slurry of very finely ground limestone may be used. The choice of neutralizing agent depends on availability, material cost, transportation cost, and other local factors. The amount of base material required is slightly more than enough to provide three moles of hydroxyl ions for each mole of $Al^{3+}$ ions in the acid mine discharge.

The dispenser for the base reagent is controlled by an electrical signal from a pH electrode placed at the outlet side of the third sedimentation pool in such a manner that the pH of the effluent stream remains between 6.0 and 6.5. This pH range satisfies both federal and state discharge requirements, and also keeps the use of base reagents to a minimum. At the same time, the concentration of dissolved aluminum is reduced to near the minimum solubility. Raising the pH beyond 6.5 has the adverse effect of increasing the aluminate ion concentration in equilibrium with aluminum hydroxides. The natural precipitation of aluminum hydroxides is a relatively slow process, requiring a larger sedimentation pool to provide enough time for the aluminum hydroxide flocs to settle. The pH control is somewhat delicate because of the sluggish reaction. This is the reason for placing the pH electrodes in the outlet side of the pool to obtain correct feedback signals to control the base dispenser mechanism.

Where the waste water already has a near-neutral pH, but still has the metallic elements in excess of allowable discharge limits, Method II can be adapted to efficiently remove the metallic elements from the solution. The dissolved aluminum is most probably below the limit because of the near-neutral pH, eliminating the need for step (c) above. However, the use of neutralizing agent is still necessary because of the secondary acidification process caused by the precipitation of the insoluble oxidized compound(s) as discussed above. Fine limestone powder can still be used as the neutralizing agent because in the absence of near-saturation dissolved aluminum, limestone will raise the pH more easily to >6.

Experimental Verification

The results obtained with the same acid mine discharge from the Queens Fork mine are shown in FIG. 8 to elucidate the contrast between the two differing methods. Calcite powder was added when the ozone generator was turned on (point [A]). The Eh-pH trace is a bit more complicated because of the competition between ozone, which lowers pH by liberating free sulfuric acid, and calcite, which raises pH by increasing basicity. At point [B] the ozone generator was turned off and the manganese dioxide and ferric hydroxide mixture was separated by centrifugation. At point [C], lime was added to raise the pH. to near 6. Translucent white precipitate of aluminum hydroxy compounds was easily separated from the colorless, clear liquid after overnight settling.

It is important to avoid adding hydrogen peroxide to the acid mine discharge or to precipitated oxides because hydrogen peroxide is detrimental to the process of the present invention. In acid solutions, hydrogen peroxide acts as a reducing agent in the presence of strongly oxidizing metal oxides and hydroxides such as $MnO_2$, $PbO_2$, $Ag_2O_3$, $CoO_2$, $NiO_2$, and $PdO_2$. Thus, acidic waste water must be treated with ozone in the absence of hydrogen peroxide.

A mixture of approximately equal amounts of a dilute acid, such as hydrochloric acid or acetic acid, (about 0.001 to 1 molar) and 4% hydrogen peroxide can be used to remove manganese stains from porcelain and other substrates that are resistant to the combination of hydrogen peroxide and the acid. This mixture can also be used to clean electrodes which are contaminated by manganese.

All references cited herein, including journal articles or abstracts, published or unpublished U.S. or foreign patent applications, issued U.S. or foreign patens, or any other references are entirely incorporated by reference herein, including all data, tables, figures, and text present in the cited references. Additionally, the entire contents of the references cited within the references cited herein are also incorporated by reference in their entirety.

References to known method steps, conventional method steps, known methods or conventional methods is not in any way an admission that any aspect, description, or embodiment of the present invention is disclosed, taught, or suggested in the relevant art.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention. Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

REFERENCES

U.S. Environmental Protection Agency (1994), Drinking water regulations and health advisories: EOA 822-R-94-001, Office of Water, EPA, Washington, D.C.

Latimer, W. M. (1952), The oxidation states of the elements and their potentials in aqueous solutions: Book, 2nd ed., Prentice-Hall, N.Y., p 389.

Pourbaix, Marcel, (1966), Atlas of electrochemical equilibria in aqueous solutions: Book, First English Ed., Pergamon Press, Oxford, London, N.Y., p 644.

Outokumpu HSC chemistry software version 3.0 (1997), Outokumpu, Finland.

Sato, Motoaki, (1960), Oxidation of sulfide ore bodies, I. Geochemical environments in terms of Eh and pH, Economic Geology, vol. 55, pp 928–961.

Nordstrom, D. K. and Ball, J. W. (1986), The geochemical behavior of aluminum in acidified surface water: Science, No. 232, pp 54–56.

Hemingway, B. S., (1982), Gibbs free energies of formation for bayerite, nordstrandite, $Al(OH)^{2+}$, and $Al(OH)_2^+$, aluminum mobility, and the formation of bauzites and laterites; Advances in Physical Geochemistry, Book, ed. S. K. Saxena, Springer-Verlag, N.Y., pp 285–316.

Robbins, E. I., et al., (1996) Microbial and mineralogical analysis of aluminum-rich precipitates that occlude porosity in a failed anoxic limestone drain, Monogalia County, West Virginia: Proc. 13th Ann. Intern. Pittsburgh Coal Conference, "Coal Energy and the Environment", Vol. 2, ed. S.-H. Chiang, pp 761–767

Rice, Rip. G., (1984), Ozone for drinking water treatment: A biography: Handbook of Ozone Technology and Applications, Vol. II, Butterworth, Boston, London, pp. 237–261.

Rozelle R. B., and Swain H. A. Jr., (1974), Removal of manganese from mine waters: Proc. Fifth Symposium on Coal Mine Drainage Research. Coal and the Environment Techn. Conf., pp 357–369.

Concurrent Technologies Corporation, (1996), Summary report on recovering metal values from acid mine drainage: Market and Technology Analyses: Submitted to Southern Alleghenies Conservancy, Bedford, Pa., Mar. 29, 1996.

What is claimed is:

1. A method for removing or recovering at least one metal as an insoluble compound, said at least one metal being selected from the group consisting of iron, manganese, lead, silver, nickel, cobalt, palladium, bismuth, and thallium, from acidic wastewater containing said at least one metal in solution as metal ion, consisting of:

introducing ozone into the acidic waste water to form insoluble oxidized compounds of the metals while monitoring the Eh and the pH values of the waste water and adjusting the amount of ozone introduced to maintain an Eh and a pH at which ozone can form an insoluble metal oxide with each metal ion in the acidic wastewater.

2. The method according to claim 1, wherein the pH of the wastewater is maintained at about 2.5 whereby metals other than iron and aluminum are precipitated.

3. The method according to claim 2 wherein after step (b) the insoluble metal oxides are recovered and then a base is added to the acidic waste water to raise the pH of the waste water above 2.5 to form ferric hydroxides.

4. The method according to claim 3 comprising removing precipitate ferric hydroxides from the waste water and further adding a base to raise the pH of the waste water to about 6–6.5.

5. The method according to claim 4 wherein the base is selected from the group consisting of limestone powder and limestone slurry.

6. The method according to claim 1 wherein a base is added to the waste water after ozonation to raise the pH to about 6–6.5.

7. The method according to claim 6 wherein the base is selected from the group consisting of limestone powder and limestone slurry.

8. The method according to claim 1 wherein the Eh of the wastewater is monitored and controlled by electrochemical sensors.

9. The method according to claim 3 wherein the formation of insoluble oxidized compounds of the metals and raising the pH of the wastewater are controlled by electrochemical sensors.

10. A method for removing or recovering metal ions as insoluble compounds, said metals being selected from the group consisting of iron, manganese, lead, silver, nickel, cobalt, palladium, bismuth, thallium, and aluminum, from acidic wastewater comprising:

a. introducing ozone and a base into the acidic waste water to raise the pH of the waste water to about 6—6.5 during ozonation to form insoluble oxidized compounds of the metals; and b. monitoring the Eh and the pH values of the waste water and adjusting the amount of ozone introduced to maintain an Eh and a pH at which ozone can form an insoluble metal oxide with the metal ion in the wastewater.

* * * * *